Oct. 8, 1963  F. R. MERRIAM, JR  3,106,656
ALTERNATOR BRUSH MOUNTING MEANS
Filed Nov. 14, 1960  3 Sheets-Sheet 2

FRANK R. MERRIAM, JR.
INVENTOR.

BY John R. Faulkner
Keith L. Zerschling

ATTORNEYS

Oct. 8, 1963 F. R. MERRIAM, JR 3,106,656
ALTERNATOR BRUSH MOUNTING MEANS
Filed Nov. 14, 1960 3 Sheets-Sheet 3

FRANK R. MERRIAM, JR.
INVENTOR.
BY John L. Faulkner
Keith L. Zerschling
ATTORNEYS – # United States Patent Office 3,106,656
Patented Oct. 8, 1963

3,106,656
ALTERNATOR BRUSH MOUNTING MEANS
Frank R. Merriam, Jr., Plymouth, Mich., assignor to Ford Motor Company, Dearborn, Mich., a corporation of Delaware
Filed Nov. 14, 1960, Ser. No. 69,048
5 Claims. (Cl. 310—239)

This invention relates to an alternator and more particularly to means for mounting electrical contact brushes in an alternator.

The present invention is directed to an alternator that may be employed as an electrical power generating device in an automotive vehicle. In such alternators, it is advantageous to employ a rotating field in combination with stationary armature coils. The field of the alternator is mounted, therefore, on the rotor of the machine while the armature coils are positioned within the stator of the machine.

With a rotating field some means must be employed to furnish electrical energy to the field, and this means conventionally takes the form of a pair of conductive slip rings mounted for rotation with the rotor. One of the slip rings is connected to one end of the field winding and the other slip ring is connected to the other end of the field winding. A pair of electrical contact brushes are positioned in contact with the rotatable slip rings so that electrical energy may be furnished the field from an external source.

In alternators employed as electrical power generators for automotive use, some means must also be employed to rectify the alternating output into direct current energy to supply direct current loads, such as batteries and lighting and accessory equipment. This rectification may be accomplished by a full wave rectifier and in a three phase alternator, three diodes, preferably of the semiconductor type, may be mounted upon a conductive plate positioned within the stator of the alternator, and three additional diodes, also of the semiconductor type may be mounted upon another conductive plate within the stator of the alternator and spaced from the first conductive plate.

In this invention new and novel means are employed for positioning the electrical contact brushes in electrical contact with the slip rings. This means includes a support member that is preferably supported in the stator of the alternator by and between the two conductive plates that carry the diodes. A pair of brush holders that carry the electrical contact brushes are pivotally supported by and on either side of the support member. A spring means is employed to both urge the brush holders and the electrical contact brushes toward the slip rings and to hold the brush holders in pivotal engagement with the support member. This spring means preferably takes the form of a spring having a pair of spaced coils and a central intermediate portion interconnecting the two spaced coils. The spaced coils preferably are positioned over hub portions of the brush holders to urge the brush holders toward the support member and the ends of the coils engage the brush holders to urge them toward the slip rings. This structure results in a reduction of the number of parts employed in conventional alternators and hence a simpler and cheaper alternator is provided.

An object of the present invention is the provision of an improved and simplified alternator that is especially adapted for use as an electrical generating mechanism for an automotive vehicle.

Another object of the invention is the provision of a new and simplified means for mounting electrical contact brushes in an alternator.

Other objects and attendant advantages of the present invention will become more readily apparent as the specification is considered in connection with the attached drawings in which:

FIG. 3 is a sectional view taken along the lines 3—3 of FIG. 2;

Figure 1:
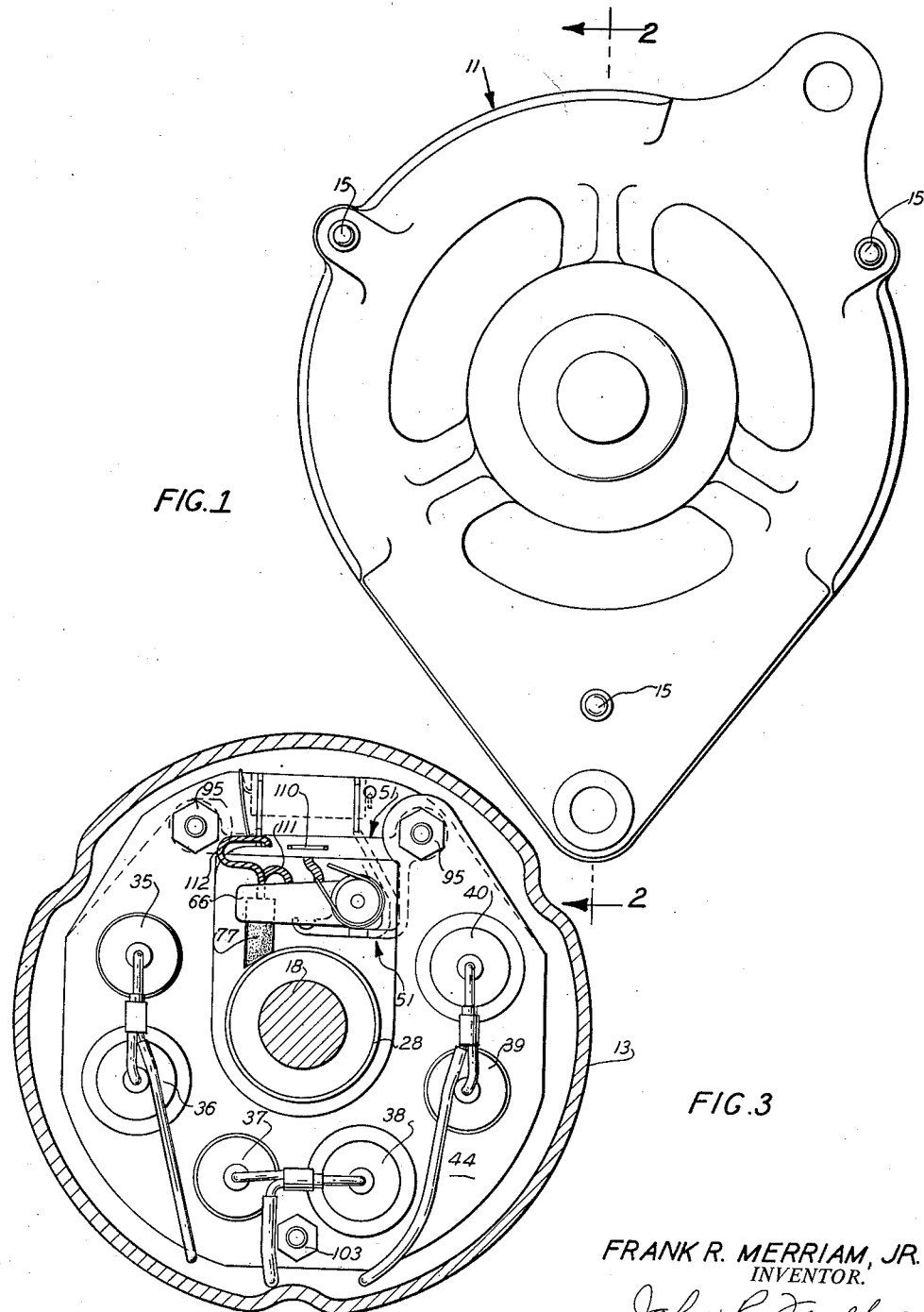
FIG. 1 is an end elevational view of the alternator of the present invention.
Figure 2:
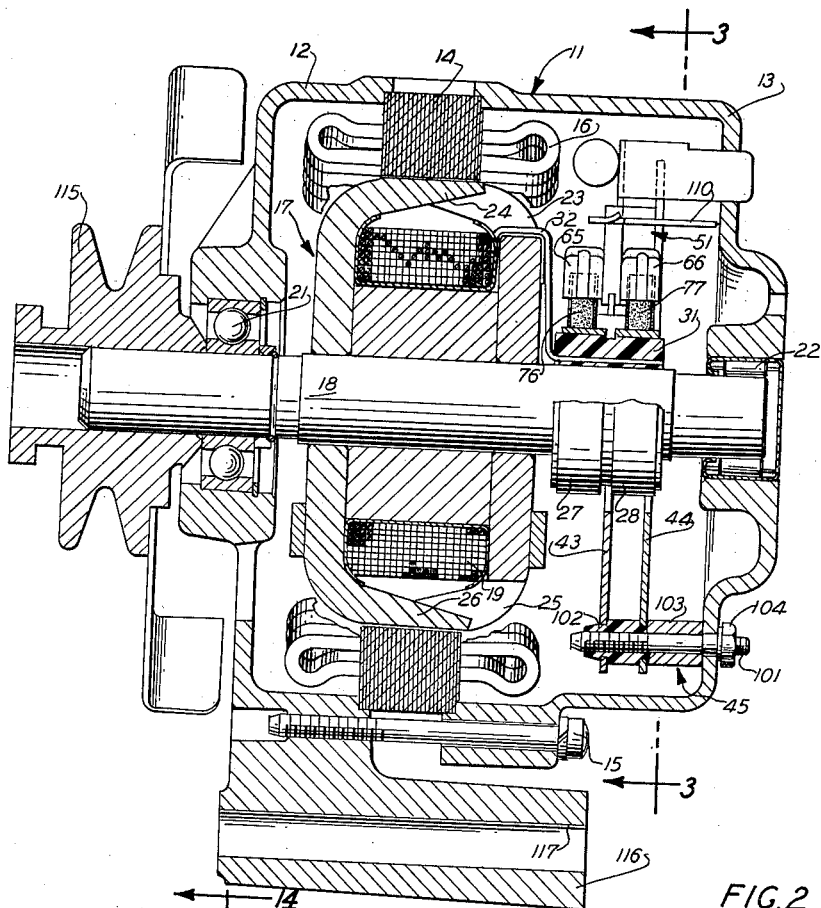
FIG. 2 is a sectional view taken along the lines 2—2 of FIG. 1.

Referring now to the drawings in which like reference numerals designate like parts throughout the several views thereof, there is shown in FIGS. 1 through 3 the alternator of the present invention. The alternator includes a stator generally designated by the numeral 11 that comprises a first cup housing 12, a second cup housing 13, and a laminated stator core 14. The stator structure is fastened together by means of a plurality of machine screws, one of which is shown at 15, that position the cup housings 12 and 13 in engagement with the laminated core 14. A stator or armature winding 16, preferably a three phase winding, is positioned about the laminated core 14 and is supported thereby.

A rotor, generally designated by the numeral 17, including a shaft 18 and a field winding 19, is rotatably supported within the stator 11 by means of antifriction bearings 21 and 22. The rotor also includes a plurality of interlaced metallic fingers, several of which are designated by the numerals 23, 24, 25 and 26, that cover the field winding 19 and that rotates in closely spaced relationship to the laminated core 14.

A pair of axially spaced slip rings 27 and 28 form a part of the rotor structure and are mounted upon the shaft 18 through a sleeve 31 constructed of insulating material. One of the slip rings is connected to one end of the field winding and the other of the slip rings is connected to the other end of the field winding by means of electrical leads, one of which is shown at 32.

The alternator also includes means positioned within and supported by the stator for rectifying the alternating electrical energy output from the stator or armature windings 16. In the preferred embodiment of the invention, as shown in the drawings, the rectifying means, if a full wave rectifier, comprises six diodes designated by the numerals 35, 36, 37, 38, 39 and 40. The diodes 36, 38 and 40 are supported from an electrical conductive plate 43 and the diodes 35, 37 and 39 are supported by a second conductive plate 44 that is spaced axially along the axis of the rotor 17 from the first conductive plate 43. The two conductive plates 43 and 44 are supported within the stator by means of bolt and spacer assemblies, one of which is shown in FIG. 2 and is designated by the numeral 45. This arrangement will be explained in greater detail at a later point in the specification.

Figure 4:
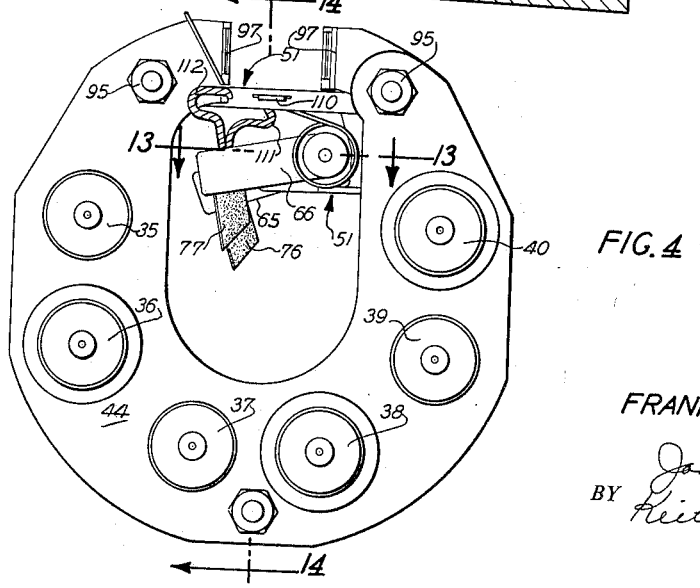
FIG. 4 is an elevational view of the rectifier and brush assembly employed in the alternator of the present invention.
Figure 5:
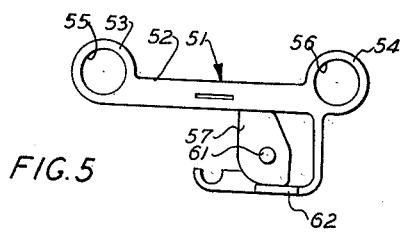
FIG. 5 is a side elevational view of the brush support member of the present invention.
Figure 6:
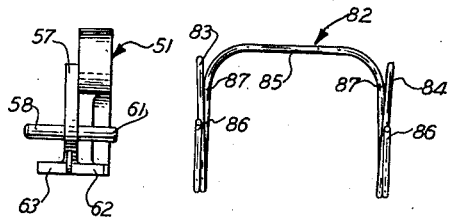
FIG. 6 is an end elevational view of the brush support member shown in FIG. 5.
Figure 12:
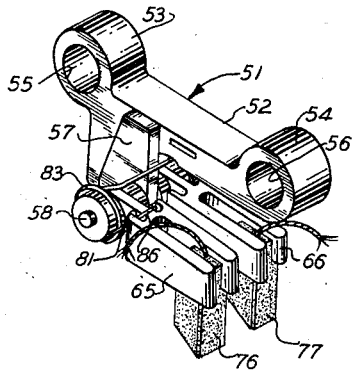
FIG. 12 is a perspective view of the brush holder assembly of the present invention.

To energize the field winding 19 the present invention employs a brush assembly as can best be seen by reference to FIGS. 3, 4 and 12. This brush assembly includes a support member 51 that is constructed of insulating material and that is supported between the two conducting plates 43 and 44 of the rectifier assembly. This support member is shown in detail in FIGS. 5 and 6, and includes a central body portion 52 having enlarged terminating end portions 53 and 54 that are provided with apertures or bores 55 and 56, respectively. The support member includes a web 57 that depends from the main body portion along one side thereof. Means for pivotally mounting a pair of brush holders are carried by the support member. This means preferably comprises a pair of pins 58 and 61 that extend from the web portion 57 and may be axially aligned with each other. These pins are preferably formed integrally with the web portion 57. A pair of stop members 62 and 63 are positioned at the bottom of the support member as a means for limiting the pivotal movement of the brush holders.

Figure 9:
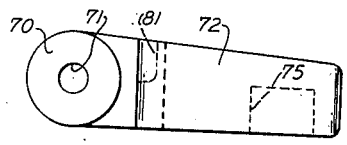
FIG. 9 is a front elevational view of a brush holder of the present invention.
Figure 10:
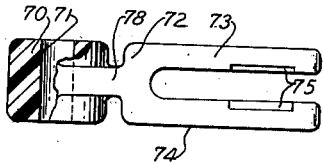
FIG. 10 is a bottom plan view of the brush holder shown in FIG. 9.
Figure 11:
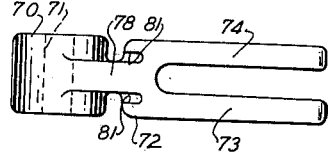
FIG. 11 is a top plan view of the brush holder shown in FIG. 9.

Referring again to FIGS. 3, 4 and 12, it can be seen that a pair of brush holders 65 and 66 are pivotally supported from the support member 51. One of these brush holders is shown in detail in FIGS. 9, 10 and 11 and it includes a hub 70 having a bore 71 positioned therein. The main body portion 72 of the brush holder is bifurcated to form a pair of arms 73 and 74, with each of the arms having a grooved portion 75 for the reception of electrical contact brushes 76 and 77, as shown in FIGS. 2, 4 and 12. Referring again to FIGS. 9 and 10, the brush holder includes an interconnecting bar portion 78 that interconnects the hub 70 with the main body portion 72 and the arms 73 and 74. As can be seen by referring to FIG. 11, each brush holder has a pair of cutaway portions or slots 81 positioned at the junction of the bar 78 with the main body portion 72.

Figure 7:
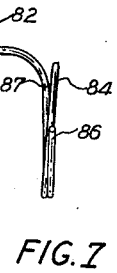
FIG. 7 is a front elevational view of the spring employed in the brush assembly of the present invention.
Figure 8:
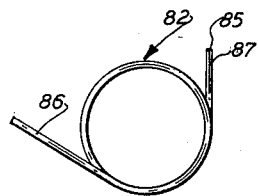
FIG. 8 is an end elevational view of the spring of FIG. 7.

A spring member designated by the numeral 82 is shown in detail in FIGS. 7 and 8. This spring member is employed to bias the brush holders 65 and 66 toward the slip rings 27 and 28 and to urge the electrical contact brushes 76 and 77 into engagement with these slip rings. As will be described subsequently, this spring means also holds the brush holders 65 and 66 in pivotal engagement with the support member 51. The spring includes a pair of spaced coils 83 and 84 and an interconnecting center bar portion 85 that extends substantially perpendicularly to the planes defined by the coils 83 and 84. Each coil has an end portion 86 that extends in a tangential direction from the coil body. Each of the coils also includes a portion 87 extending tangentially from the coil body and connected to interconnecting central bar portion 85.

Referring to FIGS. 3, 4, 12 and 13, it will be seen that the brush holders 65 and 66 are pivotally mounted upon the support member 51. This may be accomplished by placing the hub portions 70 of the brush holders over the pins 58 and 61 of the support member so that the pins extend through the apertures or bores 71 in the hubs. The spring member 82 is positioned in engagement with the support member and the two brush holders, with the interconnecting central bar portion 85 of the spring engaging the main body portion 52 of the support member. The spaced coils 83 and 84 are positioned around the portion of the hub 70 of each of the brush holders that is located remote from the web 57 of the support member. The ends 86 of the spring are positioned within the cutaway portion or slot 81 that is located remote from the web 57 of each of the brush holders so that the spring when under tension exerts a force on the side of the brush holders adjacent the main body portion of the support member. As can be appreciated, this action urges the brush holders 65 and 66 and the electrical contact brushes 76 and 77 toward the slip rings 27 and 28. Thus the spring means of the present invention performs the dual function of biasing the electrical contact brushes into engagement with the slip rings and of holding the brush holders in pivotal engagement with the support member.

Figure 14:
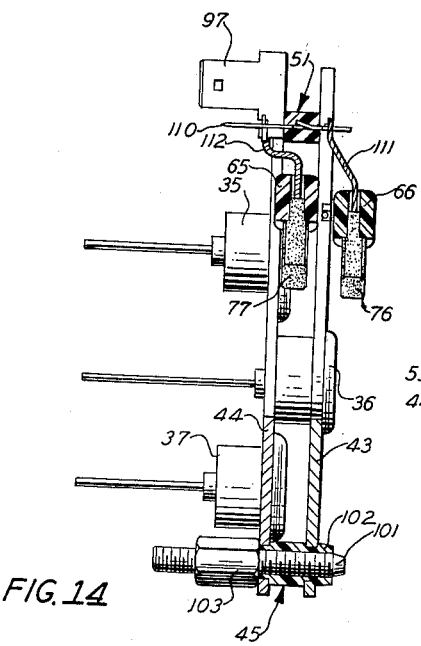
FIG. 14 is a sectional view taken along the lines 14—14 of FIG. 4.
Figure 13:
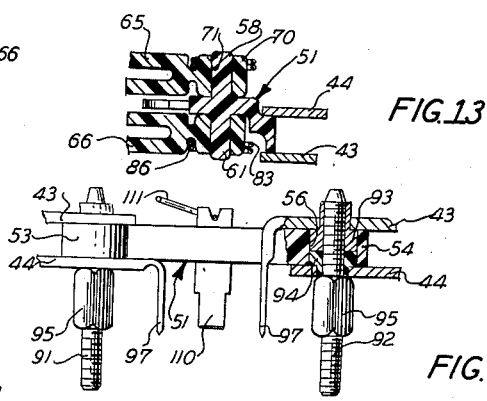
FIG. 13 is a partial sectional view taken along the lines 13—13 of FIG. 4.
Figure 15:
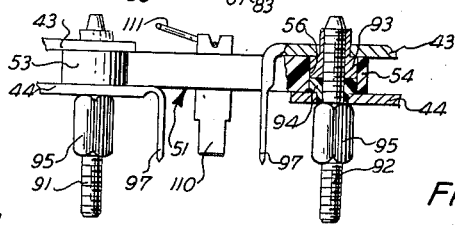
FIG. 15 is a partial top plan view of the structure shown in FIG. 4 with portions thereof shown in section.

Referring now to FIGS. 14 and 15, the support member 51 is shown supported by and between electrical conductive plates 43 and 44 and that carry the rectifying diodes. This is accomplished by means of two threaded members designated by the numerals 91 and 92. A nut 93 is positioned within each of the bores 55 and 56 in the enlarged end portions 53 and 54 of the support member, and an insulating sleeve 94 is also positioned within these bores so that the plates 43 and 44 are maintained electrically insulated from one another. A nut 95 is positioned on each of the threaded members 91 and 92 for securing the two plates against the support member. As can be appreciated from an inspection of FIG. 15, the plate 43 functions as one of the direct current terminals of the alternator and the conductive plate 44 serves as the other direct current terminal. Each of these plates has an integrally formed bent out portion designated by the numeral 97 for connection to the load supplied by the alternator.

FIGS. 2 and 14 disclose the bolt and spacer assembly 45 for positioning the two conductive plates 43 and 44 in spaced relationship and for supporting these conductive plates within the stator of the machine. The bolt and spacer assembly includes a threaded member 101, an insulated nut and bushing member 102 positioned between the plates 43 and 44, and a nut 103. As shown in FIG. 2, the threaded member 101 passes through the cup housing 13 and has a nut 104 threaded thereon for securely fastening the conductive plates 43 and 44 within the machine. It is understood that the threaded members 91 and 92, shown in FIG. 15, also pass through the cup housing 13 and that additional nuts, similar to nut 104, are threaded over these members.

Electrical contact brush 76 is connected to a field terminal 110 that extends through the support member 51. This is accomplished by a lead designated by the numeral 111. The other electrical contact brush 77 is connected to the electrical conductive plate 44, which serves as a ground, by means of a lead 112.

The present invention may be conveniently employed as an electrical power generating mechanism for an automotive vehicle. The alternator may be driven from a rotating part of the vehicle by means of a belt (not shown) and a pulley 115 that is affixed to the shaft 18. The cup housing 12 is also provided with a radially extending bracket member 116 having a bore 117 positioned therein for receiving a suitable fastening means on an automotive vehicle engine.

The present invention thus provides a novel alternator and more particularly a new and simplified means for mounting electrical contact brushes in an alternator.

It will be understood that the present invention is not to be limited to the exact construction shown and described, and that various changes and modifications may be made without departing from the spirit and scope of the invention as defined in the appended claims.

I claim:

1. An alternator comprising a stator, a rotor rotatably mounted within said stator, said rotor including a pair of spaced slip rings, a support member secured to said stator, a first electrical contact brush, first means for holding said first electrical contact brush, said first means being pivotally mounted upon one side of said support member, a second electrical contact brush, second means for holding said second electrical contact brush, said second means being pivotally mounted upon the other side of said support member, and a single spring means engaging said support member and said first and second means for urging said first and second means toward said slip rings and for urging said first and said second means into engagement with the sides of said support member.

2. An alternator comprising a stator, a rotor rotatably mounted within said stator, said rotor including a pair of spaced slip rings, a support member secured to said stator, a first pin extending from one side of said support member, a second pin extending from the other side of said support member, a first brush holder pivotally mounted upon said first pin, a second brush holder pivotally mounted upon said second pin, a spring having a pair of spaced coils and a central bar portion interconnecting said spaced coils, said central bar portion engaging said support member, one of said spaced coils engaging said first brush holder and the other of said spaced coils engaging said second brush holder, said spring being constructed and arranged to urge said brush holders mounted upon said pins toward each other and to urge said brush holders toward said slip rings.

3. An alternator comprising a stator, a rotor rotatably mounted within said stator, said rotor including a pair of slip rings axially spaced from one another, a support member affixed to said stator and extending radially inwardly toward said slip rings, a first brush holder pivotally mounted upon said support member and positioned on one side of said support member, a second brush holder pivotally mounted upon said support member and positioned on the other side of said support member, a first electrical contact brush supported by said first brush holder, a second electrical contact brush supported by said second brush holder, and spring means contacting said support member and said brush holders for holding said brush holders in engagement with the sides of said support member and for urging said brush holders toward said slip rings whereby said first electrical contact brush is maintained in engagement with one of said slip rings and said second electrical contact brush is maintained in engagement with the other of said slip rings.

4. An alternator comprising a stator, a rotor rotatably mounted within said stator, said rotor including a pair of spaced slip rings, a support member secured to said stator in a position adjacent said slip rings, a first pin extending from one side of said support member, a second pin extending from the other side of said support member in axial alignment with said first pin, a first and a second brush holder, each of said brush holders including a hub, a bifurcated body portion and a bar interconnecting said hub and said body portion, a first electrical contact brush positioned in the bifurcated body portion of said first brush holder, a second electrical contact brush positioned in the bifurcated body portion of said second brush holder, the hub of said first brush holder being pivotally mounted upon said first pin, the hub of said second brush holder being pivotally mounted upon said second pin, a spring having a pair of spaced coils and a central interconnecting portion, said central interconnecting portion engaging said support member, one of said coils being positioned around the hub of said first brush holder and engaging the bar of said first brush holder on the side thereof remote from said support member, the other of said coils being positioned around the hub of said second brush holder and engaging the bar of said second brush holder on the side thereof remote from said support member, the end of one of said coils engaging a portion of said first brush holder at a point remote from said slip rings and the end of the other of said coils engaging a portion of said second brush holder at a point remote from said slip rings, whereby said spring holds said brush holders upon said pins and pivotally urges said brush holders and said electrical contact brushes into engagement with said slip rings.

5. An alternator comprising a stator, a rotor rotatably mounted within said stator, said rotor including a pair of spaced slip rings, a support member secured to said stator, a first pin extending from one side of said support member, a second pin extending from the other side of said support member, said second pin positioned in axial alignment with said first pin, a first brush holder including a hub pivotally mounted upon said first pin, a second brush holder including a hub pivotally mounted upon said second pin, a spring having a pair of spaced coils and a central bar portion, said central bar portion engaging said support member, one of spaced coils being wrapped around the hub of said first brush holder and the other of said spaced coils being wrapped around the hub of the second brush holder, each of said brush holders having a notch positioned therein for receiving the ends of said spaced coils.

References Cited in the file of this patent
UNITED STATES PATENTS

| | | |
|---|---|---|
| 2,345,429 | Hanna | Mar. 28, 1944 |
| 2,985,782 | Stiles | May 23, 1961 |